FIG. 11.

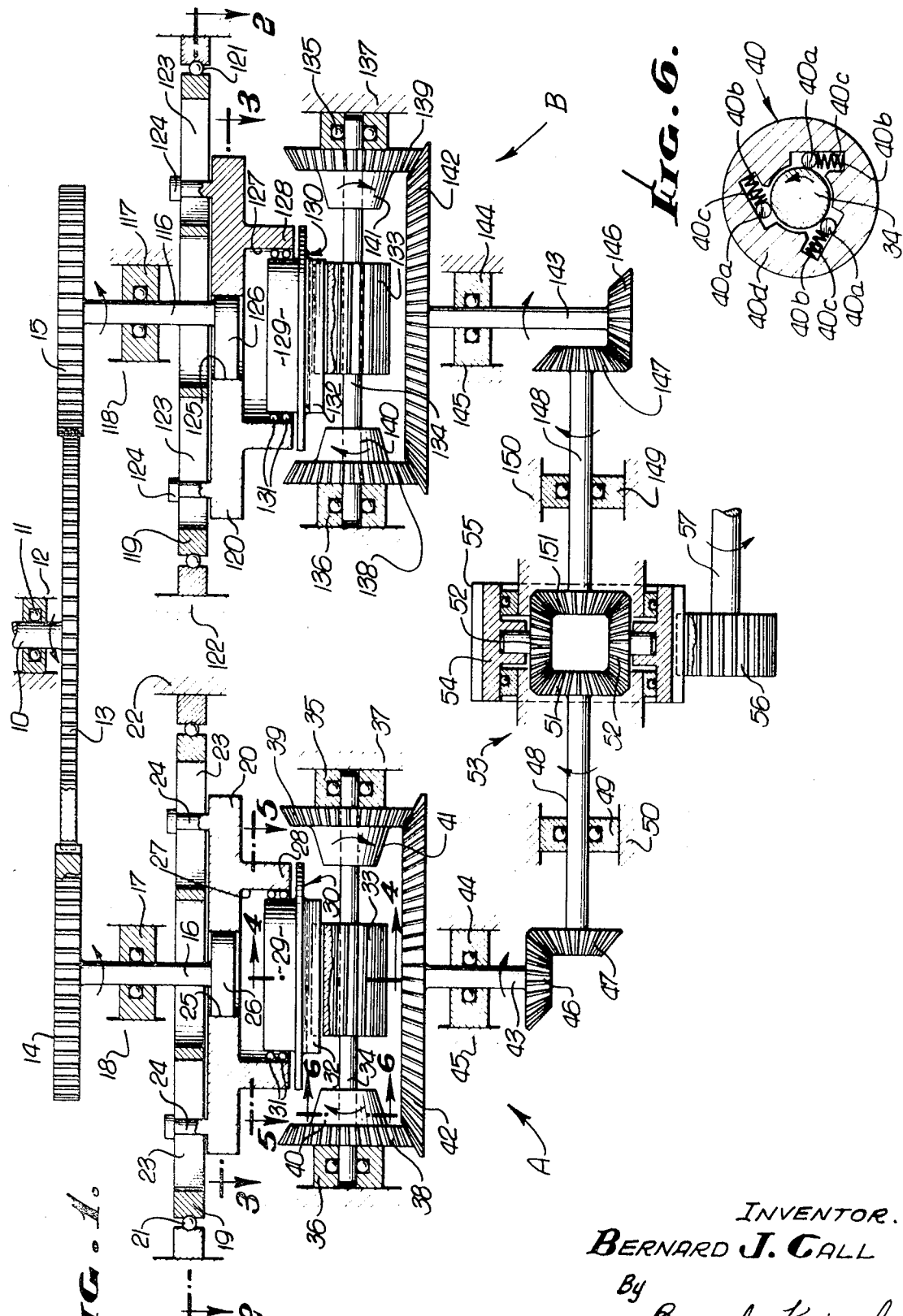

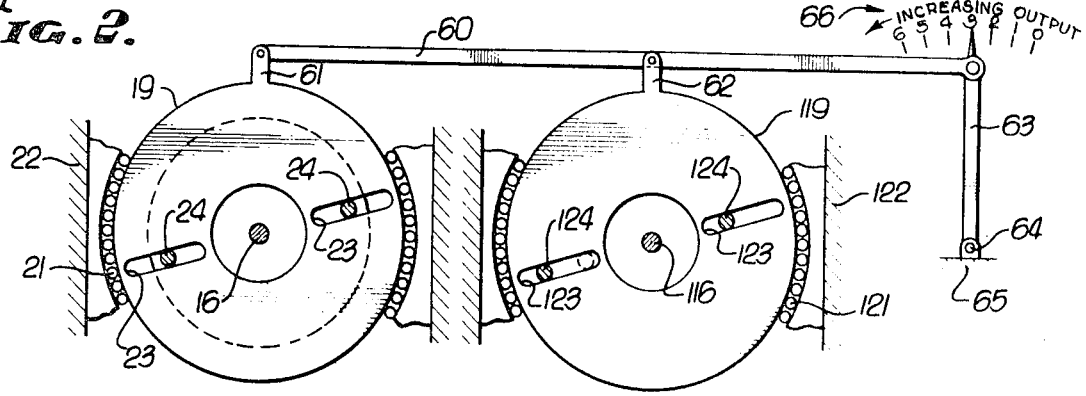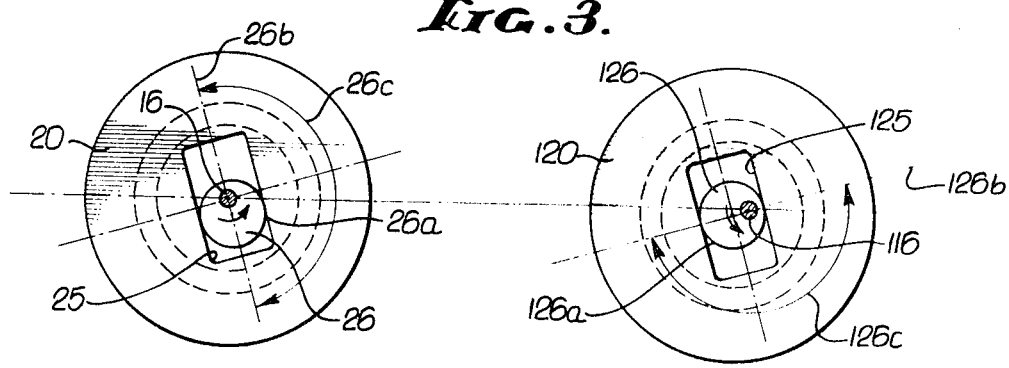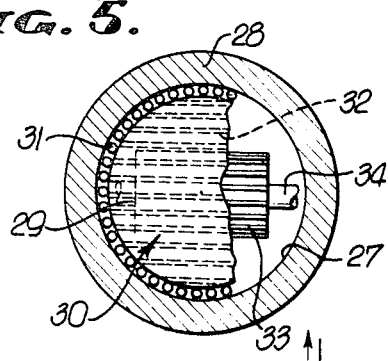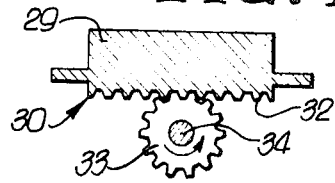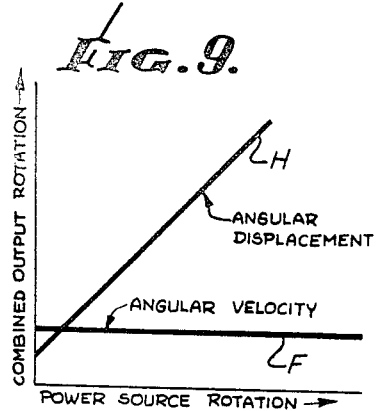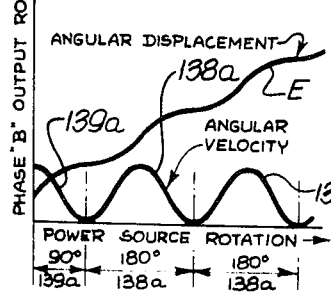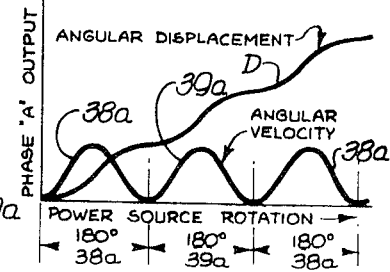
INVENTOR.
BERNARD J. CALL
By Bernard Kriegel
ATTORNEY.

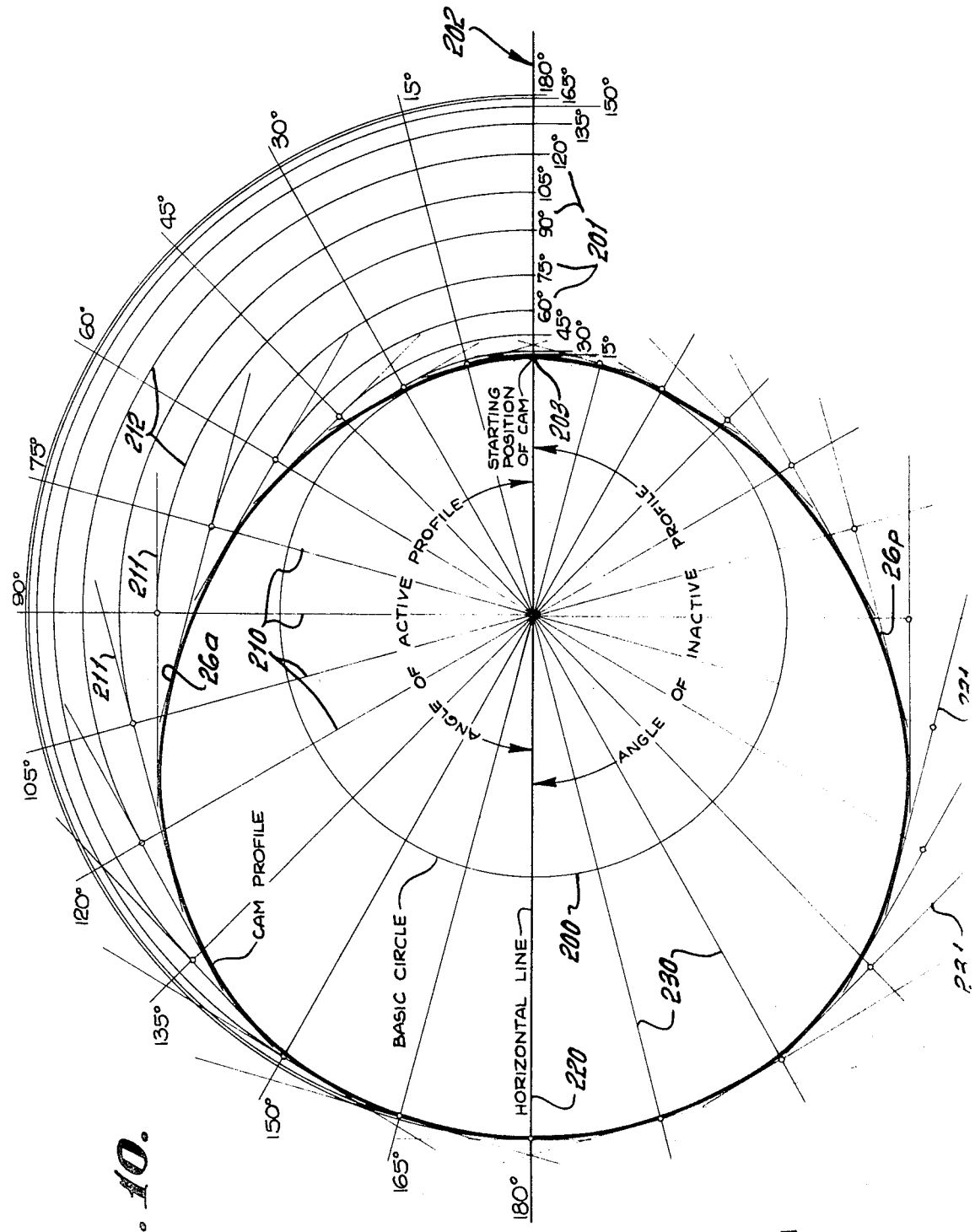

| θ, DEG. CAM ANGLE OF ROTATION | θ_R, DEG. CYCLOID CIRCLE ANGLE OF ROTATION | θ_R, RADIANS CYCLOID CIRCLE ANGLE OF ROTATION | SINE OF θ_R | a RADIUS OF CYCLOID CIRCLE | CAM FOLLOWER DISPLACEMENT ($a[\theta_R - \sin \theta_R]$) |
|---|---|---|---|---|---|
| 0° | 0° | 0.0000 RAD. | 0.000 | 0.5 | 0.0000 |
| 15° | 30° | 0.5236 RAD. | 0.500 | | 0.0118 |
| 30° | 60° | 1.047 RAD. | 0.866 | | 0.0906 |
| 45° | 90° | 1.571 RAD. | 1.000 | | 0.2854 |
| 60° | 120° | 2.094 RAD. | 0.866 | | 0.6142 |
| 75° | 150° | 2.618 RAD. | 0.500 | | 1.059 |
| 90° | 180° | 3.142 RAD. | 0.000 | | 1.571 |
| 105° | 210° | 3.665 RAD. | -0.500 | | 2.0826 |
| 120° | 240° | 4.189 RAD. | -0.866 | | 2.527 |
| 135° | 270° | 4.712 RAD. | -1.000 | | 2.856 |
| 150° | 300° | 5.236 RAD. | -0.866 | | 3.051 |
| 165° | 330° | 5.760 RAD. | -0.500 | | 3.130 |
| 180° | 360° | 6.283 RAD. | 0.000 | 0.5 | 3.1416 |

INVENTOR.
BERNARD J. CALL
By Bernard Kriegel
ATTORNEY.

United States Patent Office 3,623,376
Patented Nov. 30, 1971

3,623,376
CONTINUOUSLY ENGAGED INFINITELY VARIABLE RATIO TRANSMISSION
Bernard J. Call, 2201 Walnut Ave.,
Manhattan Beach, Calif. 90266
Filed Nov. 12, 1969, Ser. No. 875,735
Int. Cl. F16h *35/00, 29/20, 19/04*
U.S. Cl. 74—125.5
27 Claims

ABSTRACT OF THE DISCLOSURE

An infinitely variable ratio transmission in which an input shaft drives a pair of continuously engaged gear systems which respectively produce partial rotary motion of an output shaft, the cumulative angular motion of the output shaft being at constant velocity. In each system, a rotary cam reciprocates a follower and a rack carried thereby which oscillates a rack pinion, the latter intermittently rotating gearing through one-way clutches to unidirectionally rotate the output shaft. The cams are out of phase so that the output shaft is driven continuously and at constant velocity. The extent of reciprocation of the followers is adjustable to vary the transmission ratio.

---

The present invention relates to variable ratio transmissions, and more particularly to transmissions of the intermittently actuated type.

Heretofore, some variable transmission ratio gear drives have involved the shifting of gearing or clutches, the use of fluid couplings or torque converters, relatively shiftable coengaging frictional members, magnetic couplings and intermittent grip mechanisms. The prior transmissions cannot be operated to produce a smooth and predictable variation through mechanical transmission paths between their minimum and maximum transmission ratios, nor do they effect rotation of the output shaft at a uniform angular velocity throughout a variable range of loads.

The present invention contemplates a mechanical drive mechanism of infinitely variable transmission ratio, which, for each and every selected transmission ratio, positively rotates the driven or output member at a constant angular velocity, provided the driving member of the transmission is rotating at constant angular velocity.

Such a change speed transmission has advantages in respect of durability, uniformity and ease of operation, allowing, for example, the operation of a power source at constant speed while enabling the infinite variation of the transmission ratio, resulting in the desired output speed.

In accomplishing the foregoing, the invention provides a plurality, such as a pair, of rotary out-of-phase cam drives, in which a first cam has its circumference so shaped that in rotation through 180° its cam follower is caused to move in a linear direction at a velocity precisely proportional to the value of the $\sin^2$ function of the angle $\theta$ through which the cam has rotated. A second cam has the same circumferential shape as the first cam, linearly moving its follower in the same manner, but since it leads the first cam by 90°, it is a $\cos^2$ cam. The combined angular velocity imparted by the two cams to the ultimately driven member through the power trains associated with the followers is uniform for all transmission ratios to which the variable speed transmission may be adjusted.

More specifically, the invention provides a pair of rotary cam drives 90 degrees out of phase, and which effect reciprocation of racks, the racks and pinions meshing therewith effecting rotation of gears through oppositely working one-way clutches to effect the drive to an output member or shaft, the cumulative output drive being continuous, at a constant velocity, and at a selected ratio.

The invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a diagrammatic view illustrating a variable ratio transmission embodying the invention;

FIG. 2 is a fragmentary view, partly in elevation and partly in section, taken on the line 2—2 of FIG. 1, showing the change speed adjuster mechanism;

FIG. 3 is a view in section and on a reduced scale taken on the line 3—3 of FIG. 1, showing the cam devices;

FIG. 4 is a detailed view in section taken on the line 4—4 of FIG. 1, showing one of the rack and pinion mechanisms;

FIG. 5 is a detailed view in section taken on the line 5—5 of FIG. 1, with parts broken away, also showing one of the rack and pinion mechanisms;

FIG. 6 is a detailed view in section taken on the line 6—6 of FIG. 1, disclosing a typical one-way clutch employed in the transmission;

FIG. 7 is a graph representing the angular velocity and displacement of one of the output phases of the mechanism of FIGS. 1 through 6;

FIG. 8 is a graph representing the angular velocity and displacement of the other output phase of the mechanism of FIGS. 1 through 6;

FIG. 9 is a graph showing the combined angular velocity and displacement of both phases of output of the mechanism of FIGS. 1 through 6;

FIG. 10 is a layout disclosing the manner of developing a typical profile of a cam forming part of the transmission; and FIG. 11 is a table used in developing the cam of FIG. 10.

As seen in the drawings, the transmission assembly comprises a power input shaft 10 journaled in a bearing 11, which is suitably mounted in a supporting case structure portion 12. The input shaft 10 is secured to and rotates an input pinion 13, which is in mesh with an input gear 14 of a section or phase A of the transmission assembly, the gear 13 also meshing with an input gear 15 of a phase or section B of the transmission assembly.

Phase A of the assembly includes a shaft 16 secured to and driven by the gear 14 and supported in a bearing 17 in the supporting case structure portion 18. The shaft 16 extends through an annular plate 19 which constitutes, as will hereinafter appear, a control guide for a cam follower 20. The plate 19 is rotatably supported in suitable bearings 21 in a support structure portion 22. Provided in the control guide plate 19 on opposite sides of its axis a pair of radially extended slots 23, 23 in which are slidably disposed cam follower pins 24, 24 fixed to and projecting axially from the cam follower plate 20 at diametrically opposite locations. The cam follower plate 20 has an elongate centrally located slot 25 in which a radial cam 26 is rotatably disposed, the cam being suitably affixed to the shaft 16. The radial cam 26, as seen in FIG. 3, has an active profile 26a extending through 180 degrees of arc 26c at one side of a line 26b bisecting the cam 26.

Carried in a bore 27 in an axially extended portion 28 of the cam follower plate 20 is the supporting body section or hub 29 of a rack 30, suitable bearings 31 being interposed between the body 29 and the wall of the bore 27. The elongated teeth 32 of the rack 30 mesh with a pinion 33 fixed to a pinion shaft 34 rotatably supported in bearings 35 and 36 respectively carried in a suitable supporting frame structure portion 37. Oppositely facing bevel gears 38, 39 are rotatably mounted on end portions of the shaft 34, the bevel gear 38 being drivable in one direction by the shaft 34 through one-way clutch means 40, while the bevel gear 39 is adapted to be driven by the shaft 34 in the opposite direction through one-way clutch means 41, such opposite directions of rotation being indicated by the arrows in FIG. 1. The gears 38 and 39 mesh with a common gear 42 affixed to a shaft 43 journaled in a bearing 44 in the supporting case structure portion 45, the shaft 43 being fixed to a bevel gear 46 meshing with a mating bevel gear 47 secured to a phase A output shaft 48 supported in a bearing 49 in supporting case structure portion 50.

A drive sun gear 51 of a planetary or differential gear assembly 53 if fixed to the shaft 48, meshing with planetary gears 52 rotatably carried by the gear carrier 54 of the planetary assembly. The carrier gear 54 has teeth 55 in mesh with a driven gear 56 connected to the power output shaft 57 of the transmission assembly.

The phase B section of the transmission assembly is structurally essentially the same as the phase A section. It includes a shaft 116 fixed to and driven by the phase B input gear 15 and journaled in a suitable bearing 117 in the supporting case structure portion 118. The shaft 116 extends through an annular plate 119 which constitutes, as will hereinafter appear, a control guide for a cam follower 120, the plate 119 being rotatably supported in suitable bearings 121 in a support structure portion 122. Provided in the control guide plate 119 on opposite sides of its axis are a pair of radial slots 123, 123 in which are slidably disposed cam follower pins 124, 124 fixed to and projecting axially from the cam follower plate 120 at diametrically opposite locations. This cam follower plate 120 has an elongate centrally located slot 125 in which a radial cam 126 is rotatably disposed, the cam being suitably affixed to the shaft 116. The radial cam 126, as seen in FIG. 3, has an active profile 126a extending through 180 degrees of arc 126c at one side of a line 126b which bisects the cam 126, such profile being identical to the profile 26a of cam 26.

Carried in a bore 127 in an axially extended portion 128 of the cam follower plate 120 is the supporting body section 129 of a rack 130, suitable bearings 131 being interposed between the body 129 and the wall of the bore 127. The elongated teeth 132 of the rack 130 mesh with a pinion 133 fixed to a pinion shaft 134 rotatably supported in bearings 135 and 136 respectively carried in a suitable supporting frame structure portion 137.

Oppositely facing bevel gears 138, 139 are rotatably mounted on end portions of the shaft 134, the bevel gear 138 being drivable in one direction by the shaft 134 through one-way clutch means 140, while the bevel gear 139 is adapted to be driven by the shaft 134 in the opposite direction through one-way clutch means 141, such opposite directions of rotation being indicated by the arrows in FIG. 1. The gears 138 and 139 mesh with a gear 142 affixed to a shaft 143 journaled in a bearing 144 in the supporting case structure portion 145, the shaft 143 being fixed to a bevel gear 146 meshing with a mating bevel gear 147 secured to a phase B output shaft 148 supported in a bearing 149 in supporting case structure portion 150.

A drive sun gear 151 of the planetary transmission 53, opposed to the sun gear 51, is also in mesh with the planetary gears 52 of the planetary assembly.

The one-way clutch 40 shown in FIG. 6 is typical of the one-way clutches in the transmission. It includes a number of rollers 40a biased by springs 40b into wedging engagement between the inclined walls 40c of the outer clutch body 40d and the shaft 34, the body being fixed to the gear 38. Rotation of the shaft 34 in one direction will engage the clutch and effect corresponding rotation of the gear 38; whereas, reverse rotation of the shaft 34 automatically disengages the clutch and effects no rotation of the gear 38. The one-way clutch between the shaft 34 and the gear 39 is oppositely arranged so as to couple the shaft to the gear 39 when the shaft 34 is reversely rotated, that is, when the other clutch releases and cannot drive gear 38, and to release when the shaft 34 is rotating in a direction to drive the gear 38. Thus, rotation of the shaft 34 in one direction effects rotation of the gear 38 in that same direction; whereas, its rotation in the opposite direction rotates gear 39 in such opposite direction. The same holds true for the transmission of motion from the shaft 134 through the one-way clutches to the gears 138 and 139.

As seen in FIG. 2, means are provided for adjusting the angular relationship of the guide plate 19 and 119 in respect of the cam follower plates 20 and 120, so as to vary the extent of displacement of the cam follower plates in response to rotation of the cams 26 and 126. This adjusting means includes a control link 60 connected to an arm 61 on the guide 19 and to an arm 62 on the guide 119 so as to angularly shift the guides in unison and in the same directions. An actuator lever 63 is pivotally supported at 64 on supporting structure 65 so as to move through an arc represented by the indicia 66 which denotes the "Increasing Output" of the transmission assembly in the direction of the arrow between zero and maximum. It will be understood that at zero output adjustment of the plates 19 and 119, the slots 23, 123 will be parallel to the rack teeth 32, 132, the cams reciprocating the followers 20, 120 in a direction parallel to the rack teeth and effecting no reciprocation of the racks effective to turn the pinions 33, 133 meshing therewith. However, if the angle of the slots 23 and 123 is increased, by shifting the lever 63 to incline the guides 19, 119, the effective stroke of the racks 30 and 130 will be correspondingly increased.

In the operation of the transmission thus far described, rotation of the input gear 14 will effect rotation of the cam 26 and reciprocation of the cam follower 20 to effect reciprocation of the rack 30 in a direction normal to its teeth a distance depending upon the angular disposition of the guide 19 and its slots 23. The teeth 32 of the rack 30 are elongated to allow sliding movement of these teeth with respect to the teeth of the pinion 33 so that the teeth remain fully meshed as the rack moves longitudinally of the pinion 33 while reciprocating in a direction normal to the pinion axis.

Such reciprocation of the rack 30 is translated into rotation of the gears 38 and 39 in opposite directions through their respective one-way clutches 40, 41, and such rotation is transmitted through the gearing 42, 43, 46 and 47 to the output shaft 48 of phase A of the transmission assembly. The same action occurs simultaneously in phase B of the transmission assembly to effect rotation of the output shaft 148 in the same direction as the shaft 48. However, phase A and phase B are 90 degrees out of phase to produce a uniform angular velocity of the shaft 57, as explained hereinbelow, the shafts 48 and 148 drving through the differential 53 and the carrier gear 54 which meshes with the gear 56 affixed to the final output shaft 57.

Only one-half of the peripheral surface of the cam 26 is effective for reciprocating the follower 20 and producing pinion rotation reciprocation of the rack 30 when the guide 19 is adjusted above a zero position. This peripheral cam portion is indicated by the arc 26c in FIG. 3 of the drawings. Such peripheral portion of the cam is effective to shift the follower 20 and the rack 30 in one direction by acting against one side of the follower slot 25 through 180 degrees of rotation of the cam, and such surface 26a is then effective against the opposite side of the slot 25 to reciprocate the follower 20 and rack 30 in the opposite direction. Thus, the cam is effective to shift the follower 20 and rack 30 in one direction from a zero angular velocity to a maximum, and then back to a zero angular velocity, while acting through one of the one-way clutches, such as the clutch 40, to rotate the gear 38. It is then effective when moving in the opposite direction to act through the clutch 41 to rotate the gear 39 from a zero angular velocity up to a maximum, and then back down to a zero angular velocity. The remainder of the 360 degrees of the cam surface is not effective, but is formed in such manner as to cause the cam 26 to fit with reasonable working clearance between the opposed side walls of the elongate slot 25.

A similar action occurs with the cam 126, which has an effective working surface 126a of 180 degrees in extent, this working surface operating first on one side of the slot 125 and then on the opposite side of the slot to reciprocate the follower 120 and the rack 130 and act through the rack pinion 133 and shaft 134 to alternately rotate the gear 138 and the gear 139 in opposite directions. As noted above in connection with the phase A portion of the transmission, the gear 138 of phase B has an angular velocity imparted to it ranging from zero to a maximum, and then back to zero, during 180 degrees of rotation of the cam 126, and then the gear 139 has its angular velocity increased from zero to a maximum, and then back to zero, during the next 180 degrees of rotation of the cam 126. The angular velocities of the phase A and phase B of the transmission are represented diagrammatically in FIGS. 7 and 8, and the combined output is represented in FIG. 9.

As disclosed in FIG. 7, during 180 degrees of rotation of the cam 26, the gear 38 is driven to drive the meshing gear 42 at an angular velocity ranging from zero to a maximum and back to zero and represented by the sin² wave curve portions 38a in FIG. 7 produced during 180 degrees of rotation of the cam 26. During the next 180 degrees of rotation of this cam, the follower 20 and rack 30 are reciprocated in the opposite direction so that no rotation whatsoever is transmitted through the pinion 33 and gear 34 to the gear 38, in view of the automatic disengagement of the one-way clutch 40. However, the reverse reciprocation of the rack effects rotation of the gear 39 represented by the sin² wave curve portion 39a in FIG. 7 as during the next 180 degrees of rotation of the cam 26. During the next succeeding 180 degrees of rotation, the foregoing cycle is repeated so that the drive alternately is effected from zero to a maximum through the gears 38 and 39 and to the common gear 42 meshing therewith, the angular velocity of this gear being represented by the sin² wave 38a, 39a, in FIG. 7. The angular displacement of this gear under the rotation of the cam 26 in the same direction is represented by the curve D in FIG. 7.

FIG. 8 represents the angular velocity in the angular displacement of phase B of the transmission, but since the cam 126 is 90 degrees out of phase with the cam 26, being 90° ahead of cam 26, the wave representing the angular velocity of the gear 142 will also be 90 degrees out of phase, or ahead, with respect to the sin² wave depicted in FIG. 7. The wave representing the angular velocity in FIG. 8 is a cos² wave. Thus, the reciprocation of the follower 120 and the rack 130 will first drive the gear 138 from zero to a maximum and back to zero during 180 degrees of rotation of the cam, such angular velocity being represented by the cos² wave curve portion 138a; whereas, the next 180 degrees of rotation of the cam 126 will reciprocate the follower 120 and the rack 130 in the opposite direction to rotate the gear 139 from zero to a maximum and back to zero, represented by the curve 139a in FIG. 8, the rotation of the gears 138 and 139 being transmitted to the common gear 142. The combined angular velocities of both gears 138, 139 are represented by the continuous cos² wave 138a, 139a. The angular displacement of the common gear 142 is depicted by the curve E in FIG. 8.

Since both phase A and phase B of the transmission are being operated simultaneously, the angular velocities represented by the sin² and cos² waves in FIG. 7 and FIG. 8 will act together to result in the combined angular velocity represented by the straight line curve F in FIG. 9, which will be the angular velocity of the ultimately driven shaft 57. It is noted that this is a constant angular velocity for a constant speed of rotation of the drive shaft 10 and for a particular adjustment of the guide plates 19 and 119; that is to say, for a fixed transmission ratio of adjustment. The angular displacement of the ultimately driven shaft 57 will also be the straight line curve H depicted in FIG. 9. The differential movements of the varying angular velocities imparted to the shafts 48 and 148 will be compensated for in the planetary gearing 53.

An example of a sin² cam 26 and the development of its circumference or profile are illustrated in FIG. 10 and in the accompanying table, FIG. 11.

The cam 26 is shaped on its circumference 26a such that, as it rotates through an arc of 180°, the cam follower 20 is caused to move in a linear direction at a velocity precisely proportional to the value of the sin² function of the angle $\theta$ in which the cam has rotated. As a result, the distance travelled by the cam follower 20 at any given time is the same as the horizontal distance travelled by a point on a rolling wheel which describes a cycloid. Thus, $$\text{horizontal travel} = a(\theta_R - \sin \theta_R)$$

where $a$ = radius of a circle used for generation of the cycloid. The total horizontal distance travelled by the point on the cycloid is equal to $2\pi a$ (its circumference).

$\theta_R$ = angle in radians that cycloid has rotated. This is equal to 2 times the angle in radians that the cam has rotated since it (the cam) produces a full horizontal stroke in 180° of rotation.

In the table (FIG. 11), a number of angular positions of the cam are tabulated, ranging from 0° to 180°. Corresponding values of 2 times the angle in radians ($\theta_R$) are listed along with the values of the sin $\theta_R$. In FIG. 10, a basic circle 200 is established, which represents the shaft 16 or supporting disc to which the cam is to be fastened, or profiled as an integral part. It may be selected of any size at the convenience of the designer of the machine. Next, a cycloid radius $a$ is selected, such that it will result in a desired stroke for the cam follower 20 (total travel=$2\pi a$). The positions 201 of the cam follower are noted on a horizontal line 202 to the right of the starting position 203 of the cam. (This is a point on the basic circle at a position where $\theta$, the angle of cam rotation, is assumed to start). The positions 201 noted are those to which the cam follower is pushed by the cam as it rotates through the corresponding angle $\theta$ of cam rotation. They are obtained from the table (FIG. 11), which has them listed according to the formula:

$$\text{horizontal travel} = a(\theta_R - \sin \theta_R)$$

For simplicity of explanation, but not limiting in principle, the cam follower is shown to be a flat vertical surface. The required profile 26a of the cam 26 is then established by the following graphical steps:

(1) Lines 210 are drawn radially outward from the center of rotation of the cam, corresponding to the angular positions set forth in the table of FIG. 11.

(2) Each of these lines 210 is then crossed by a perpendicular line 211 at a distance, from the center of rotation, that is equal to the distance to which the cam follower has been pushed. This is conveniently verified by connecting a circular arc 212 between this point and the point on the horizontal axis 220 to which the cam follower has been pushed by the cam.

(3) A cam profile 26a is then drawn in by connecting all of the perpendicular lines 211 by a common tangent. The common tangent may be tangent to the perpendicular lines at any point, provided the tangent points are encountered in sequence according to the tabulation (FIG. 11), and provided the $\theta$ positions of 0° and 180° occur on the horizontal line 220. The cam profile 26a may be constructed to any degree of refinement and accuracy by increasing the number of tangent points used to guide the controlling dimensions of the final part.

Through the foregoing procedure, the active profile 26a of the $\sin^2\theta$ cam has been constructed. The inactive profile 26p which goes from 180° to 360°, completing the perimeter, is constructed by drawing radial lines 230 incrementally throughout these values of $\theta$(180° to 360°). These lines are then crossed by perpendicular lines 231. The perpendicular lines 231 are all positioned a common distance from the diametrically opposite perpendicular lines 211 employed in determining the active cam profile 26a. This common distance is equal to the horizontal distance between the cam edges ($\theta=0°$ and 180°). This distance is also equal to the width of the opening 25 in the cam follower 20 between the follower cam engaging surfaces.

Construction of the $\cos^2$ cam 126 is identical to that of the $\sin^2$ cam. It is a $\cos^2$ cam by virtue of its installation position in the cam follower 120. It is positioned such that the active profile 126a engages the cam follower 126 at all times precisely when the angle $\theta$ of rotation is 90° greater than, or ¼ of a revolution ahead of, the $\sin^2$ cam 26. The full cam stroke is accomplished in 180° of rotation; therefore, the $\cos^2$ cam stroke is begun in midstroke of the $\sin^2$ cam stroke.

It should also be noted that the characteristic linear velocity wave form imparted to the cam followers by the $\sin^2$ and $\cos^2$ cams is identical to the linear velocity wave form identified as the quantity sine plus a constant, wherein the constant is precisely equal to the maximum negative value of the sine. This relationship with respect to the form of the wave is readily recognized by combining two common trigonometric indentities, as follows:

$$\cos 2x = 1 - 2 \sin^2 x; \text{ or } 2 \sin^2 x = 1 - \cos 2x$$

also since $$\cos x = -\sin(x-90°)$$
$$\cos 2x = -\sin(2x-90°)$$

therefore, $$\sin(2x-90°) + 1 = 2 \sin^2 x$$

This implies that a sine wave plus a constant is equal to a multiple of a $\sin^2$ wave. Although the phase relationship and magnitude may differ, the wave form is the same. The former designation, $\sin^2$ and $\cos^2$, readily lends itself to use in the mathematical proof of uniform output motion of transmissions constructed according to the teachings of the present invention. This proof is established by the mathematical relationship, $\sin^2 + \cos^2 = 1$.

The designation of the motion as a sine or cosine plus a constant is one and the same as designation of the motion as $\sin^2$ or $\cos^2$, which can also be proven to create linear output motion by the following mathematical reasoning. The algebraic sum of the value of the sines of two or more angles is equal to zero provided these angles are all precisely equally spaced between the angles of 0° and 360°. Examples are as follows:

$\sin 0° + \sin 180° = 0$
$\sin 0° + \sin 120° + \sin 240° = 0$
$\sin 0° + \sin 90° + \sin 180° + \sin 270° = 0$
$\sin 0° + \sin 10° + \sin 20° + \ldots$
$\qquad + \sin 330° + \sin 340° + \sin 350° = 0$ therefore:

$$(\sin \theta_1 + \text{constant}) + \sin \theta_2 + \text{constant}) = (2 \text{ constant})$$

provided $\theta_1$ and $\theta_2$ are equally spaced between 0 and 360°. This also establishes a proof that linear output motion can be produced in transmissions constructed according to the teachings of this invention by utilizing any number of phases provided the phases are properly spaced (equal angular spacing).

It is, accordingly, apparent that a comparatively simple, out-of-phase, infinitely variable ratio change speed transmission has been provided in which a positive drive is effected, the transmission ratios being changed readily from zero movement of the ultimate output shaft 57 to a maximum speed within the range of operation of the mechanism.

I claim:

1. In an infinitely variable change speed transmission, first and second cam and follower means in complementary out-of-phase relationship, power input means for driving said cam and follower means, power output means driven by said cam and follower means, and means for adjusting said cam and follower means in unison to vary the transmission ratio of said transmission, said power output means including rack and pinion means driven by said cam and follower means, a shaft rotatable by said rack and pinion means, a pair of gears rotatable relative to said shaft, oppositely acting one-way clutch means for alternately drivingly connecting said shaft to said gears, and an output gear driven by said pair of gears.

2. In an infinitely variable change speed transmission, first and second cam and follower means in complementary out-of-phase relationship, power input means for driving said cam and follower means, power output means driven by said cam and follower means, and means for adjusting said cam and follower means in unison to vary the transmission ratio of said transmission, said cam and follower means each including a guide plate having a sliding connection with the follower of said cam and follower means, said follower having a cam slot, said cam being rotatable in said slot and engaging said follower, and said power output means includes a rack carried by said follower, a pinion engaged by said rack, a pinion shaft supporting and secured to said pinion, a pair of gears on said pinion shaft, oppositely acting one-way clutch means for driving said pair of gears respectively in opposite directions responsive to reciprocation of said rack and pinion, and an output gear engaged with said pair of gears.

3. In an infinitely variable change speed transmission, first and second cam and follower means in complementary out-of-phase relationship, power input means for driving said cam and follower means, power output means driven by said cam and follower means, and means for adjusting said cam and follower means in unison to vary the transmission ratio of said transmission, said power output means including a rack carried by the follower of each of said cam and follower means, a pinion engaged by said rack, a pinion shaft supporting said pinion, a pair of gears on said pinion shaft, oppositely acting one-way clutch means for driving said pair of gears respectively in opposite directions responsive to reciprocation of said rack and pinion, and an output gear engaged with said pair of gears.

4. In an infinitely variable change speed transmission, support structure, an input gear rotatable in said support structure, a pair of driven gears engaged with said input gear, a pair of guides carried by said support structure and adjustable angularly, means for adjusting the angularity of said guides, a pair of cam followers having sliding coengagement with said guides, a pair of cams connected to said driven gears, said cams being in 90 degrees out-of-phase relation, one of said cams being engaged with one of said followers, the other of said cams being engaged with the other of said followers, a rack carried by each of said followers and reciprocable by said followers in response to rotation of said cams, a pinion engaged by each of said racks, a pinion shaft secured to said pinion, and output means, including one-way clutch means, driven by the respective pinion shafts in response to rotation of said cams.

5. In an infinitely variable change speed transmission as defined in claim 4, said output means including a differential driven by the respective pinion shafts.

6. In an infinitely variable change speed transmission as defined in claim 4, said output means including a planetary differential driven by the respective pinion shafts.

7. In an infinitely variable change change speed transmission as defined in claim 4, said output means including a pair of gears on the respective pinion shafts, said one-way clutch means driving said pair of gears in opposite directions responsive to reciprocation of said rack, a gear engaged with said pair of gears, and an output shaft driven by said last-mentioned gear.

8. In an infinitely variable change speed transmission as defined in claim 4, said output means including a pair of gears on the respective pinion shafts, said one-way clutch means driving said pair of gears in opposite directions responsive to reciprocation of said rack, a gear engaged with said pair of gears, an output shaft driven by said last-mentioned gear, and a differential driven by the respective output shafts.

9. In a change speed transmission, a guide plate, means mounting said guide plate for angular adjustment, said guide plate having guide slots extending radially therein, a member having portions disposed in said slots for sliding engagement with said guide plate, means for effecting movement of said member laterally relative to said plate, whereby said member is caused to reciprocate by said portions in said slots, a rack carried by said member, a pinion engaged with said rack, and a pinion shaft connected to said pinion.

10. In a change speed transmission as defined in claim 9, a gear rotatable on said pinion shaft, and one-way clutch means for connecting said gear to said pinion shaft.

11. In a change speed transmission as defined in claim 9, a pair of gears rotatable on said pinion shaft, one-way clutch means connecting the respective gears of said pair to said pinion shaft upon rotation of said pinion shaft in opposite directions, and an output gear engaged with said pair of gears.

12. In an infinitely variable change speed transmission, driving means, driven means, positive drive transmission means for transmitting motion between said driving means and driven means including a plurality of transmission paths in out-of-phase relation with respect to each other for driving said driven means, each transmission path including a first means producing and transmitting a variable velocity $sin^2$ wave form of motion 90 degree out-of-phase with the $sin^2$ wave form of motion of the other transmission path, each transmission path further including a second means engaging said first means, said $sin^2$ wave form of motion being transmitted from said first means to said second means, whereby such wave forms of motion combine to actuate said driven means at uniform velocity, and means for angularly adjusting the relative position between said first and second means to vary the ratio of transmission between said driving means and driven means.

13. In an infinitely variable change speed transmission as defined in claim 12; wherein each of said transmission paths includes a cam and a follower coacting therewith, said cams being in 90 degree out-of-phase relation to each other, each cam having an active surface shaped to impart said $sin^2$ wave form of motion to the follower coacting therewith.

14. In an infinitely variable change speed transmission: a first rotatable cam; a first follower engaging said cam to be reciprocated thereby; a first motion transmitting member engaged by and reciprocated by said first follower; a second cam; a second follower engaging said second cam to be reciprocated thereby; a second motion transmitting member engaged by and reciprocated by said second follower; means for simultaneously rotating said cams to effect simultaneous reciprocation of said followers and motion transmitting members; a driven member; means interconnecting said motion transmitting members and driven member for converting the reciprocating motion of said motion transmitting members to unidirectional rotary motion of said driven member; each of said cams being shaped to impart a velocity of $sin^2$ wave form to its companion follower and motion transmitting member and to said converting means; said cams being 90 degrees out-of-phase with respect to each other to cause said followers and motion transmitting members to drive said driven member through said converting means at a constant angular velocity; and means for adjusting the relative position between each follower and its companion motion transmitting member to vary the extent of reciprocating motion transmitted by said follower to its companion motion transmitting member.

15. In a transmission as defined in claim 14; means mounting said first motion transmitting member on said first follower; means mounting said second motion transmitting member on said second follower; said adjusting means effecting relative turning between each follower and its companion motion transmitting member.

16. In a transmission as defined in claim 14; said first motion transmitting member being a first rack; said second motion transmitting member being a second rack; said motion converting means comprising a first pinion continuously meshing with said first rack, a second pinion continuously meshing with said second rack, and means including one-way coupling means between each pinion and driven member.

17. In a transmission as defined in claim 14; said first motion transmitting member being a first rack; said second motion transmitting member being a second rack; said motion converting means comprising a first pinion continuously meshing with said first rack, a second pinion continuously meshing with said second rack, and means including one-way coupling means between each pinion and driven member; means mounting said first rack on said first follower; means mounting said second rack on said second follower; said adjusting means effecting relative turning between each follower and its companion rack.

18. In a transmission as defined in claim 14; said adjusting means including a guide member for each follower, said guide member and follower having coengaging means enabling said follower to reciprocate along said guide member, and means for simultaneously turning said guide members and followers relative to said motion transmitting members to vary the extent of reciprocating movement of said motion transmitting members.

19. In a transmission as defined in claim 14; said first motion transmitting member being a first rack; said second motion transmitting member being a second rack; said motion converting means comprising a first pinion continuously meshing with said first rack, a second pinion continuously meshing with said second rack, and means including one-way coupling means between each pinion and driven member; means mounting said first rack on said first follower; means mounting said second rack on said second follower; said adjusting means including a guide member for each follower, said guide member and follower having coengaging means enabling said follower to reciprocate along said guide member, and means for effecting relative simultaneous turning between said racks and said guide members and followers to vary the amplitude of reciprocation of said racks by said cams and followers.

20. In a transmission as defined in claim 14; said first motion transmitting member being a first rack; said second motion transmitting member being a second rack; said motion converting means comprising a first pinion continuously meshing with said first rack, a second pinion continuously meshing with said second rack, and means including one-way coupling means between each pinion and driven member; means mounting said first rack on said first follower; means mounting said second rack on said second follower; said adjusting means effecting relative turning between each follower and its companion rack; one of said first rack and first pinion and one of said second rack and second pinion having elongated teeth to allow sliding movement of the teeth of said racks along the teeth of their respective companion pinions during reciprocation of said racks by said cams and followers.

21. In an infinitely variable change speed transmission, support structure, an input gear rotatable in said support structure, a pair of driven gears engaged with said input gear, a pair of guides carried by said support structure, a pair of cam followers having sliding engagement with said guides, a pair of cams connected to said driven gears, said cams being in 90 degrees out-of-phase relation, one of said cams being engaged with one of said followers, the other of said cams being engaged with the other of said followers, a rack carried by each of said followers and reciprocable by said followers in response to rotation of said cams, a pinion engaged by each of said racks, a pinion shaft secured to said pinion, output means, including one-way clutch means, driven by the respective pinion shafts in response to rotation of said cams, and means for adjusting the angularity between each of said followers and the racks carried thereby.

22. In an infinitely variable change speed transmission, support structure, a pair of guides carried by said support structure, a pair of cam followers having sliding engagement with said guides, a pair of cams, means for simultaneously rotating said cams, said cams being in 90 degrees out-of-phase relation, one of said cams being engaged with one of said followers, the other of said cams being engaged with the other of said followers, a rack carried by each of said followers and reciprocable by said followers in response to rotation of said cams, a pinion engaged by each of said racks, output means, including one-way clutch means, driven by the respective pinions in response to rotation of said cams, and means for adjusting the angularity between each of said followers and the racks carried thereby.

23. In a transmission as defined in claim 22; said output means including a pair of gears, said one-way clutch means driving said pair of gears in opposite directions responsive to reciprocation of said rack, a gear engaged with said pair of gears, and an output member driven by said last-mentioned gear.

24. In a transmission as defined in claim 22; said output means including a pair of gears, said one-way clutch means driving said pair of gears in opposite directions responsive to reciprocation of said rack, a gear engaged with said pair of gears, an output member driven by said last-mentioned gear, and a differential driven by the respective output members.

25. In a transmission: a guide member; a follower reciprocable along said guide member; a rack carried by and reciprocable with said follower and angularly adjustable with respect thereto; a pinion meshing with said rack; means for adjusting the relative angular relation between said rack and follower to vary the amplitude of reciprocation of said rack in response to reciprocation of said follower; and means for reciprocating said follower along said guide member.

26. In a transmission as defined in claim 25; said rack being mounted on said follower and relatively rotatable thereon; said adjusting means relatively turning said rack on said follower.

27. In a transmission as defined in claim 25; said pinion meshing constantly with said rack.

References Cited
UNITED STATES PATENTS

| | | | |
|---|---|---|---|
| 1,346,139 | 7/1920 | Smith | 74—123 |
| 1,739,554 | 12/1929 | Lindholm | 74—121 |
| 2,183,193 | 12/1939 | Husson | 74—124 |
| 2,943,505 | 7/1960 | Parks | 74—679 X |

FOREIGN PATENTS

| | | | |
|---|---|---|---|
| 20,371 | 4/1930 | Australia | 74—117 |
| 449,460 | 12/1912 | France | 74—121 |
| 996,723 | 9/1951 | France | 74—121 |

CARLTON R. CROYLE, Primary Examiner

T. C. PERRY, Assistant Examiner

U.S. Cl. X.R.

74—33, 110, 121